United States Patent
Bonczkowski et al.

(10) Patent No.: US 9,483,281 B2
(45) Date of Patent: Nov. 1, 2016

(54) METHODS, SYSTEMS, AND COMPUTER READABLE MEDIUMS FOR UPDATING COMPONENTS IN A CONVERGED INFRASTRUCTURE SYSTEM

(71) Applicant: VCE Company, LLC, Richardson, TX (US)

(72) Inventors: Joshua Lee Bonczkowski, Apex, NC (US); Joseph K Malek, Seattle, WA (US); Todd Dolinsky, Chapel Hill, NC (US); Nicholas Adams Hansen, Willow Spring, NC (US)

(73) Assignee: VCE IP Holding Company LLC, Richardson, TX (US)

( * ) Notice: Subject to any disclaimer, the term of this patent is extended or adjusted under 35 U.S.C. 154(b) by 93 days.

(21) Appl. No.: 14/143,979

(22) Filed: Dec. 30, 2013

(65) Prior Publication Data

US 2015/0082016 A1  Mar. 19, 2015

Related U.S. Application Data (60) Provisional application No. 61/878,325, filed on Sep. 16, 2013.

(51) Int. Cl.
  *G06F 9/44* (2006.01)
  *G06F 9/445* (2006.01)
(52) U.S. Cl.
  CPC ............. *G06F 9/44505* (2013.01); *G06F 8/61* (2013.01)
(58) Field of Classification Search
  CPC .. G06F 11/2257; G06F 9/44505; G06F 8/65; G06F 8/67; G06N 5/00; G06N 5/025; G06N 5/04; G06Q 10/06; G06Q 10/10
  See application file for complete search history.

(56) References Cited

U.S. PATENT DOCUMENTS

| | | | |
|---|---|---|---|
| 6,789,215 B1 | 9/2004 | Rupp et al. | |
| 8,671,228 B1 | 3/2014 | Lok et al. | |
| 8,869,143 B2 | 10/2014 | Bocking et al. | |
| 8,924,941 B2 | 12/2014 | Krajec et al. | |
| 9,021,460 B2 * | 4/2015 | Yoshida | G06F 8/65 717/168 |
| 9,065,746 B2 | 6/2015 | Dolinsky et al. | |
| 9,268,630 B1 * | 2/2016 | Walston | G06F 8/65 |
| 9,298,446 B2 * | 3/2016 | Chang | G06F 8/665 |

(Continued)

OTHER PUBLICATIONS

VCE Company, VBlock Solution for Application Lifecycle Platform, Aug. 2011, 33 pages.*

(Continued)

*Primary Examiner* — Thuy Dao
(74) *Attorney, Agent, or Firm* — Jenkins, Wilson, Taylor & Hunt, P.A.

(57) ABSTRACT

Methods, systems, and computer readable mediums for updating components in a converged infrastructure system are disclosed. According to one method, the method includes identifying components in a converged infrastructure system that require remediation in order to comply with a defined converged infrastructure configuration and determining remediation content to enable each of the identified components to be compliant with the defined converged infrastructure configuration. The method further includes retrieving the remediation content for the identified components from a repository and utilizing the remediation content to update the identified components on the converged infrastructure system in accordance with the defined converged infrastructure configuration.

14 Claims, 10 Drawing Sheets

(56) References Cited

U.S. PATENT DOCUMENTS

| | | | |
|---|---|---|---|
| 9,378,005 B2* | 6/2016 | Ramanathan | G06F 8/61 |
| 2004/0078726 A1 | 4/2004 | Little et al. | |
| 2006/0010497 A1* | 1/2006 | O'Brien | G06Q 10/10 726/26 |
| 2010/0082803 A1* | 4/2010 | Nguyen | G06Q 10/20 709/224 |
| 2012/0254852 A1* | 10/2012 | Emaru | 717/173 |
| 2013/0014107 A1 | 1/2013 | Kirchhofer | |
| 2013/0047153 A1 | 2/2013 | Emaru | |
| 2013/0308495 A1* | 11/2013 | Tucker et al. | 370/254 |
| 2014/0259000 A1 | 9/2014 | Desanti et al. | |
| 2014/0282395 A1 | 9/2014 | Wang et al. | |
| 2015/0212812 A1 | 7/2015 | Tripathi et al. | |
| 2015/0378751 A1* | 12/2015 | Finn | G06F 21/6218 713/100 |

OTHER PUBLICATIONS

Huang et al., A service composition model for dynamic service creation and update in IMS/Web 2.0 converged environment, Nov. 2010, 8 pages.*

Applicant-Initiated Interview Summary for U.S. Appl. No. 14/144,025 (Sep. 23, 2015).

Final Office Action for U.S. Appl. No. 14/144,025 (Jul. 21, 2015).

Non-Final Office Action for U.S. Appl. No. 14/144,025 (Mar. 5, 2015).

Notification of Transmittal of the International Search Report and the Written Opinion of the International Searching Authority, or the Declaration for International Patent Application No. PCT/US2014/047585 (Oct. 22, 2014).

VCE Company, LLC, "VCE Support Overview," pp. 1-5 (2012).

Notice of Allowance and Fee(s) Due for U.S. Appl. No. 14/144,025 (Mar. 14. 2016).

Non-Final Office Action for U.S. Appl. No. 14/144,025 (Oct. 8, 2015).

"VCE Vision™ Intelligent Operations Software for Converged Infrastructure," vce.com, pp. 1-7 (2015).

Yamakami, "Foundation-based Mobile Platform Software Engineering: Implications to Convergence to Open Source Software," pp. 206-211 (Nov. 2009).

* cited by examiner

METHODS, SYSTEMS, AND COMPUTER READABLE MEDIUMS FOR UPDATING COMPONENTS IN A CONVERGED INFRASTRUCTURE SYSTEM

PRIORITY CLAIM

This application relates and claims priority to U.S. Provisional Patent Application Ser. No. 61/878,325 filed on Sep. 16, 2013, the disclosure of which is incorporated herein by reference in its entirety.

TECHNICAL FIELD

The subject matter described herein relates to updating hardware and software system components. More specifically, the subject matter relates to methods, systems, and computer readable mediums for updating components in a converged infrastructure system.

BACKGROUND

In the converged infrastructure system (CIS) industry, CIS models may be validated to run very specific versions of firmware and software that have been thoroughly tested and verified to function properly. This validation process enables customers (i.e., system operators) to avoid spending a significant amount of time conducting their own validations to locate versions of compatible CIS component software. Notably, the aforementioned validation process results in a Release Certification Matrix (RCM) or some other type of defined converged infrastructure configuration model for a specific CIS model.

Prior to delivery to a customer site, a CIS unit is provisioned with an initial converged infrastructure configuration version. Over time, new converged infrastructure configuration versions are released and the system operator may decide to migrate to the new defined converged infrastructure configuration version. To perform this migration process, system operators must read documentation from the CIS manufacturer that addresses the firmware and software versions. Afterwards, the system operator must locate the correct firmware and software updates and installation instructions for each of the hardware and software components in the CIS from one or more manufacturers. In addition to the considerable amount of time required to plan an RCM update, the actual converged infrastructure configuration update process can span several weeks and takes a considerable amount of manual effort to implement.

SUMMARY

Methods, systems, and computer readable mediums for updating components in a converged infrastructure system are disclosed. According to one method, the method includes identifying components in a converged infrastructure system that require remediation in order to comply with a defined converged infrastructure configuration and determining remediation content to enable each of the identified components to be compliant with the defined converged infrastructure configuration. The method further includes retrieving the remediation content for the identified components from a repository and utilizing the remediation content to update the identified components on the converged infrastructure system in accordance with the defined converged infrastructure configuration.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable mediums for updating components in a converged infrastructure system (CIS). As used herein, converged infrastructure systems, such as Vblock™ Systems from VCE Company, LLC, can comprise multiple components or elements in a preconfigured or prepackaged computing platform. For example, a CIS unit can comprise a computing platform associated with racks of physical components and related software for performing virtualization and/or other functions. In some embodiments, each component associated with a converged infrastructure system can comprise multiple components that include one or more computing components, software components, networking components, storage components, hardware component, and/or firmware components. For example, a converged infrastructure system unit can comprise data storage devices, servers, networking equipment, and software for managing physical resources and/or virtualized resources (e.g., virtual servers).

The disclosed subject matter facilitates a remediation feature that enables an authorized end user (e.g., a system operator) to determine if a CIS unit is configured in a manner that complies with a supported CIS configuration. If the CIS unit is not in a supported configuration (e.g., outdated firmware, BIOS, software, etc.), the user is enabled to remediate one or more of the components within the CIS unit so that the components are compliant with a supported CIS configuration. In the event an authorized user wants to remediate a component contained in a CIS unit, the user does not need to provide any additional information. For example, a CIS management module can instead be configured to access each component with the CIS unit and return relevant information to the user. In addition, the CIS management module may have access to binary software needed to remediate each CIS component. Specifically, the disclosed subject matter allows for remediating a CIS component in an automated matter that requires little or no additional interaction by the authorized user. Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
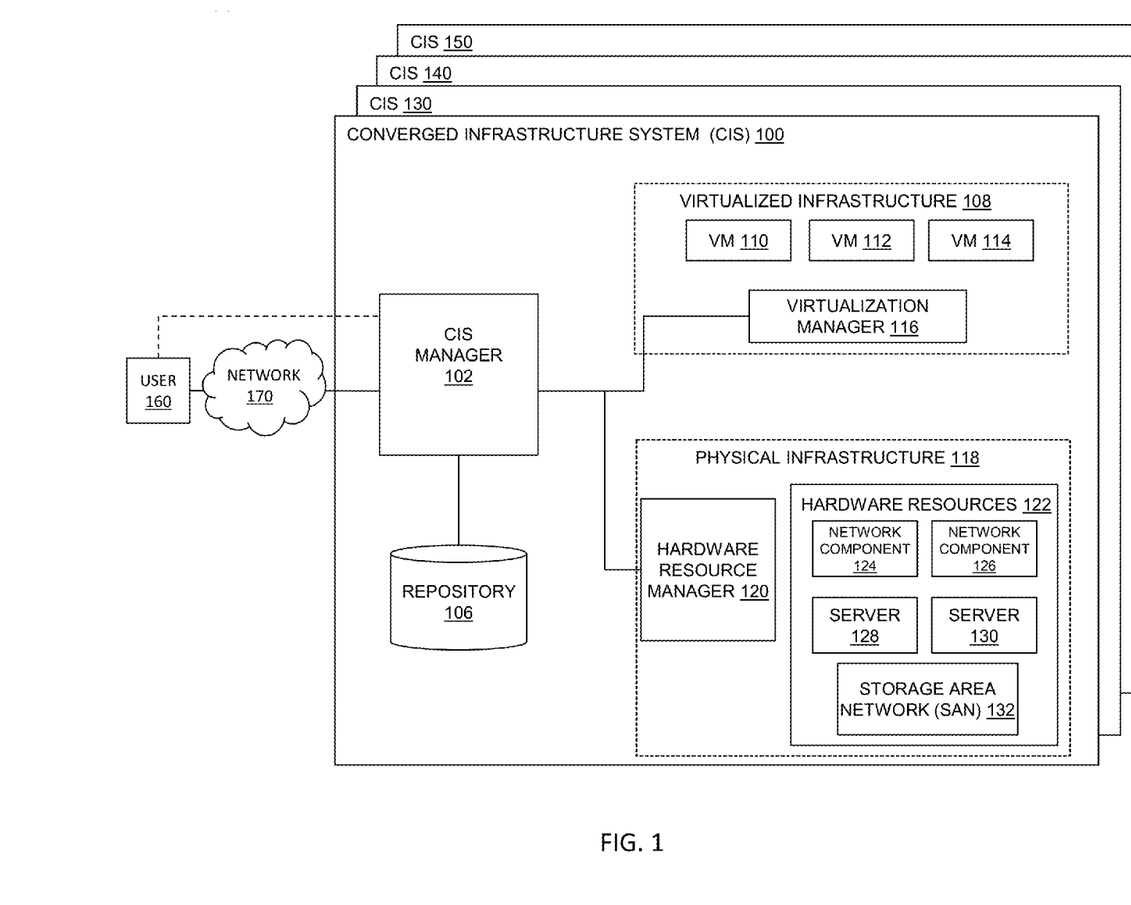
FIG. 1 is a diagram illustrating exemplary converged infrastructure systems according to an embodiment of the subject matter described herein.

FIG. 1 is a diagram illustrating exemplary CIS 100, CIS 130, CIS 140, and CIS 150 according to an embodiment of the subject matter described herein. Each of CIS 100, CIS 130, CIS 140, and CIS 150 can comprise one or more physical resources and one or more virtual resources. Exemplary physical resources can comprise a processor, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. Each of CIS 100, CIS 130, CIS 140, and CIS 150 may also comprise software and related components for managing CIS and/or portions therein.

In some embodiments, each of CIS 100, CIS 130, CIS 140, and CIS 150 may be configured to provide data center functionality, cloud service functionality, and/or other functionality. In some embodiments, each of CIS 100, CIS 130, CIS 140, and CIS 150 can comprise similar components and may be located at one or more physical locations or sites. Each of CIS 100, CIS 130, CIS 140, and CIS 150 may be capable of communicating with each other and may communicate with various other entities, such as network nodes and users. For example, user 160 (e.g., a human operator or an automated system) may use an application programming interface (API) or web-based graphical user interface (GUI) to login to CIS 100 and/or a related component for conducting an converged infrastructure (CI) configuration update. In some embodiments, user 160 may establish communication directly to CIS 100 without use of network 170.

CIS 100 can comprise CIS manager 102 (e.g., a CIS management module), a repository 106, virtualized infrastructure 108, and/or physical infrastructure 118. CIS manager 102 may be any suitable entity for managing aspects of CIS 100. CIS manager 102 may be configured to communicate with various CIS components, such as virtual resources, physical resources, and/or software for managing various components. For example, CIS manager 102 may be configured to manage performance, resource utilization levels, and other aspects associated with virtualized infrastructure 108 and/or physical infrastructure 118. In some embodiments, CIS manager 102 comprises VCE Vision™ Intelligent Operations software and/or firmware. In some embodiments, CIS manager 102 may have access to remediation content (such as remediation software content that comprises binary software) needed to remediate and update each CIS component in one or more of CIS 100, CIS 130, CIS 140, and CIS 150.

Virtualized infrastructure 108 can comprise a virtualization environment configured to simulate components of a computing device, e.g., a processor, system memory, and a storage device, for executing one or more virtual machines (VMs) (e.g., VM 110, VM 112, and VM 114). Each of VM 110, VM 112, and VM 114 may be configured to perform various functions and/or services, such as web server functions or cloud application services, and may interact with various nodes, components, and/or users.

In some embodiments, virtualized infrastructure 108 may be associated with one or more virtual entities. Each virtual entity can comprise one or more CIS or portions therein, e.g., resources from one or more CISs. In some embodiments, virtualization manager 116 may allow logical entities to be created, deleted, or modified using an API and/or GUI. Virtualization manager 116 may be any suitable entity (e.g., software executing in a virtual machine) for managing aspects associated with virtualized infrastructure 108. In some embodiments, virtualization manager 116 may be configured to provide data center management through one or more communications interfaces. For example, virtualization manager 116 may communicate with one or more third-party management tools using APIs.

Physical infrastructure 118 can comprise hardware resources 122, such as network components 124-126, servers 128-130 (sometimes referred to as "hosts"), and at least one storage area network (SAN) 132. Hardware resources 122 may be communicatively connected to various other components in CIS 100 and other entities. Hardware resources 122 can be configured to be used by one or more virtual entities. In some embodiments, network components 124-126 (e.g., network switches) may be configured to enable communication between the components in CIS 100. For example, server 128 and SAN 132 may be used in implementing VM 110 and VM 112 and server 130 and SAN 132 may be used in implementing VM 114 and virtualization manager 116. In some embodiments, one or more file share storage (FSS) systems (not shown) can be utilized to provide file system level access to a CIS across a local area network (LAN).

Physical resource manager 120 may be any suitable entity (e.g., software executing in a virtual machine) for managing aspects associated with physical infrastructure 118. In some embodiments, physical resource manager 120 may be configured to provision hardware resources 122 via one or more communications interfaces. For example, physical resource manager 120 may provision hardware resources 122 for implementing one or more virtual entities in virtualized infrastructure 108. In some embodiments, physical resource manager 120 may comprise any management element or entity, such as a unified infrastructure manager (UIM) or a unified computing system (UCS) director entity, which is configured to provision the physical hardware of a CIS.

Repository 106 may include any data storage unit (e.g., a database or plurality of databases) that may be configured to store remediation software content (e.g., CI configuration update content) used to update CIS components. In some embodiments, the remediation software content or CI configuration update content can comprise such as a firmware package, a BIOS package, or a software package, or any other package configured to contain binary software content. Although FIG. 1 depicts repository 106 as a local data storage unit residing on CIS 100, repository 106 can also be embodied as a data storage unit located at a public distributed content site, on a local proxy server in a customer's environment, or on a different CIS unit without departing from the scope of the disclosed subject matter. In some embodiments, repository 106 may be provisioned with remediation software content that is sourced from a known, online location (e.g., hosted by creators of the software content). In some embodiments, repository 106 can be provisioned with remediation software content sourced from a second repository (e.g., from a second CIS or an online location). For example, the provisioning of remediation software content copied from a second repository may be conducted using any form of transportable media, such as a compact disc (CD), universal serial bus (USB) device, and the like. Similarly, the remediation software content may be copied from an online site, online repository, or any other online location over a network, using secure copy (SCP) protocol, file transfer protocol (FTP), or any like protocol. In some embodiments, CIS 100 and a second CIS (not shown) may be located at a common site and can be communicatively connected by a wired connection. In such a configuration, repository 106 may be provisioned with remediation software content from the second CIS via the wired connection. It is understood that the provisioning of repository 106 with remediation software content with the exemplary methods described above may be conducted via any automated or automatic manner. Furthermore, repository 106 may be provisioned with remediation software content prior to CIS manager 102 determining the defined CI configuration to be applied and/or the identification of CIS components identified to require remediation by the defined CI configuration. Additional description and functionality of repository 106 is included below.

It will be appreciated that FIG. 1 is for illustrative purposes and that various nodes, their locations, and/or their functions as described above in relation to FIG. 1 may be changed, altered, added, or removed.

Figure 2:
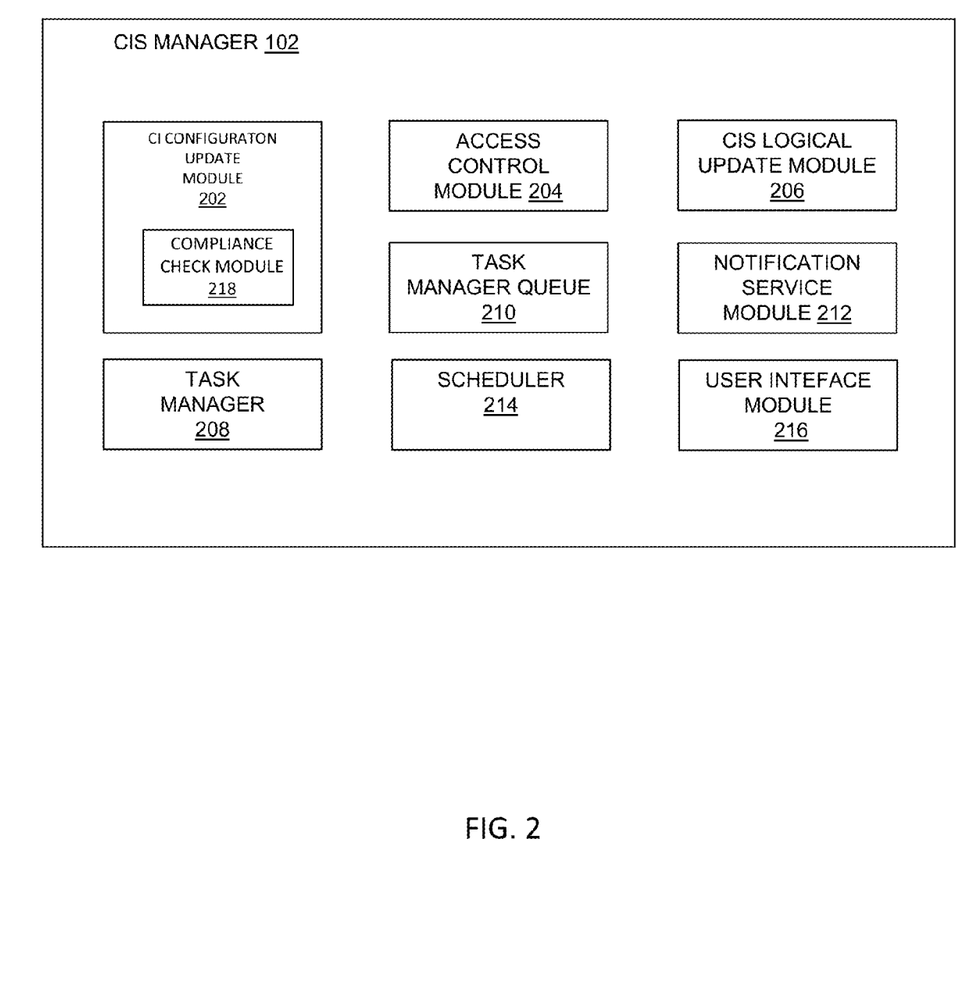
FIG. 2 is a diagram illustrating an exemplary converged infrastructure system management module according to an embodiment of the subject matter described herein.

FIG. 2 is a diagram illustrating an exemplary CIS management module according to an embodiment of the subject matter described herein. In FIG. 2, CIS manager 102 comprises a plurality of modules, such as a CI configuration update module 202 (i.e., an update framework module), an access control module 204, a CIS logical update module 206, a task management module (i.e., task manager) 208, a notification service module 212, a scheduling module (i.e., scheduler) 214, and a user interface (UI) module 216. CIS manager 102 may further comprise a task manager queue 210. In some embodiments, CIS manager 102 may also include system library that may be used to facilitate communications with and obtain data from CIS components. In some embodiments, CIS manager 102 may be comprised of one or more compute systems that are either physical or virtual. Each of these components is described in greater detail below.

In some embodiments, CI configuration update module 202 may comprise an update framework module or any suitable entity (e.g., software executing on a processor) for implementing a CI configuration update (e.g., an RCM update). For example, to implement an CI configuration update within CIS 100 or portion therein, CI configuration update module 104 may be configured to conduct authorization and authentication processes with access control module 204, create update tasks with task manager 208, provide task updates to task manager queue 210, obtain update content data from repository 106, delegate logic resources with logical update module 206, and perform any additional actions required to conduct a CI configuration update.

In some embodiments, CI configuration update module 202 can interact with access control module 204. Access control module 204 can comprise any suitable entity (e.g., hardware, firmware, or software in combination with hardware and/or firmware) for configuring and/or implementing access, authentication, and/or authorization functions. Access control module 204 can comprise or provide one or more communications interfaces for interacting with user 160, virtualized infrastructure 108, physical infrastructure 118, and/or other entities, such as nodes in network 170, CIS 130, CIS 140, and CIS 150 (as depicted in FIG. 1). In some embodiments, access control module 204 can be configured to perform and/or can utilize user authentication. For example, access control module 204 can use central authentication service (CAS) or another authentication mechanism for authenticating a user. After user authentication, access control module 204 can allow the authorized user to view and/or modify RBAC related settings, e.g., via a GUI. In some embodiments, role-based access policy utilized by module 204 can comprise one or more permissions to utilize a service, a resource, or a component associated with performing a particular role.

In some embodiments, CI configuration update module 202 may include a compliance check module 218 that is configured to identify the CIS components that require remediation and/or updating in order to comply with a designated CI configuration (e.g., as selected by a system administrator or operator). For example, upon being notified of the designated CI configuration version to be applied to a CIS, compliance check module 218 may be configured to compare the revision identifiers of the CIS components (e.g., the revision/version number of the associated CIS component firmware, BIOS, software, drivers, etc.) associated with the designated CI configuration version to the revision identifiers of the CIS components currently utilized by the CIS. Notably, the revision identifiers may comprise any number of letters, numbers, and/or symbols.

In some embodiments, CI configuration update module 202 can interact with a task manager 208 to conduct CI configuration updates for each CIS component via the creation of a task. Namely, task manager 208 can comprise a component that facilitates the creation of a task. For example, a task can be created by providing a name for the task (e.g., updating VNX-5500 at 127.0.0.1 to firmware x.y.z), the object of the task (e.g., schedule with key 123), the action the task is performing (e.g., Component Update), and the context for the component creating the task (e.g., CI configuration Update Framework, arguments={a, b, c}). In some embodiments, the task can also be updated using either an API call (e.g., a representational state transfer (REST) API call or alternatively, a non-REST API) or by pushing a message onto task manager queue 210 (e.g., an advanced message queuing protocol (AMQP) queue) that task manager 208 is monitoring (e.g., listening on). In either scenario, the update can be stored in a TaskHistory object and one or more attributes can be stored at a TaskDetail level.

Creation of a new task via task manager 208 generates a task object. In some embodiments, a task object is a reference identifier (ID) for the task itself. For example, the task object is expected to be exchanged between processes and used as a common reference ID for event correlation by registering the task ID with log messages. In some embodiments, task manager 208 can be configured to create a static, persistent message queue, such as task manager queue 210. Messages that arrive on task manager queue 210 may contain the task and the identity of a user initiating an update or change. The message can also contain at least one of TaskStatus, percentage complete, or a message.

In some embodiments, a task may contain additional sub-tasks. In such scenarios, a caller thread in CIS manager 102 can create a TaskGroup instead of a task. After a TaskGroup is generated, tasks can each be subsequently added as a member to the TaskGroup. In addition, this process allows for updates to be performed at both the sub-task level as well as the overall TaskGroup level. In some embodiments, individual tasks can be cancelled by a user via task manager 208. Likewise, TaskGroups can be stopped or cancelled by the user. For example, cancelling a TaskGroup will cancel all running tasks within the TaskGroup. Similarly, stopping a TaskGroup will allow currently running tasks to complete, but will future tasks will be prevented from starting. A stopped TaskGroup can be restarted, which in turn will cause any non-complete tasks to start. In some embodiments, the stop and resume features of TaskGroup are optional features.

In some embodiments, CIS manager 102 can comprise or interact with notification service module 212. In some embodiments, notification service module 212 can comprise an API (e.g., a REST API) that facilitates the sending of a direct notification. In some embodiments, a notification may include an email sent via a simple mail transfer protocol (SMTP) server. Notification service module 212 enables CIS manager 102 to send any number of notifications in an asynchronous manner. Notification service module 212 can persist and queue the notification to support the remote destination being unavailable for some time. When a notification is sent, log messages can be used to document and detail the type of message sent (or failed to send and requeueing), the manner in which the message was sent, to whom the message was sent, and who requested the message to be sent. In some embodiments, notification service module 212 may support notifications over email and over protocols like SNMP and IRC.

In some embodiments, notification service module 212 can be configured to monitor for task updates using task manager queue 210. For example, notification service module 212 can provide an API to register the notification to a task and the type of task updates in which to notify. Therefore, when notification service module 212 reads an appropriate update for a task to notify on, the configured notification for that task will be queued and sent.

Notification service module 212 can also be configured to maintain a library of templates for notifications. Notification service module 212 can be configured to determine the reason a notification is being sent and determine how to send the notification. Based on this information, notification service module 212 may be configured to ascertain and load an appropriate template to use for the notification. Additionally, the templates may be stored locally in such a way that system operators can modify a template to accommodate any need (e.g., add branding information to an email).

In some embodiments, CIS manager 102 can comprise or interact with a scheduler (i.e., scheduling module) 214. In some embodiments, scheduler 214 may be configured to schedule a retrieval of update data stored in a repository. Scheduler 214 may also be configured to schedule when to initiate a CI configuration update through CIS manager 102. Notably, scheduler 214 can be configured to create a new task from task manager module 208. If scheduler 214 has a notification for the schedule, scheduler 214 may also inform notification service module 212 whom to notify and under what conditions to notify (e.g., notify over email to address when the task completes success or failure).

In some embodiments, notification service module 212 can subsequently send a request to the code that was registered with the scheduled job. For example, in the case of a repository update schedule, repository 106 can be notified over any potential API by notification service module 212, such as using a hypertext transfer protocol (HTTP) POST request method. Scheduler 214 can supply all of the metadata stored in the schedule as well as a task that scheduler 214 has created for the particular CI configuration update. Repository 106 can then utilize the task to send messages to task manager module 208 that pertain to the current status for the repository update.

After repository 106 has completed the update, a final task message can be sent with a status of success. This message is used to update task manager module 208. In addition, notification service module 212 can also read the task update message and determine that the task has completed and if related conditions were met. Notification service module 212 can determine whom to notify and how to send the appropriate message (e.g. email).

Figure 3:
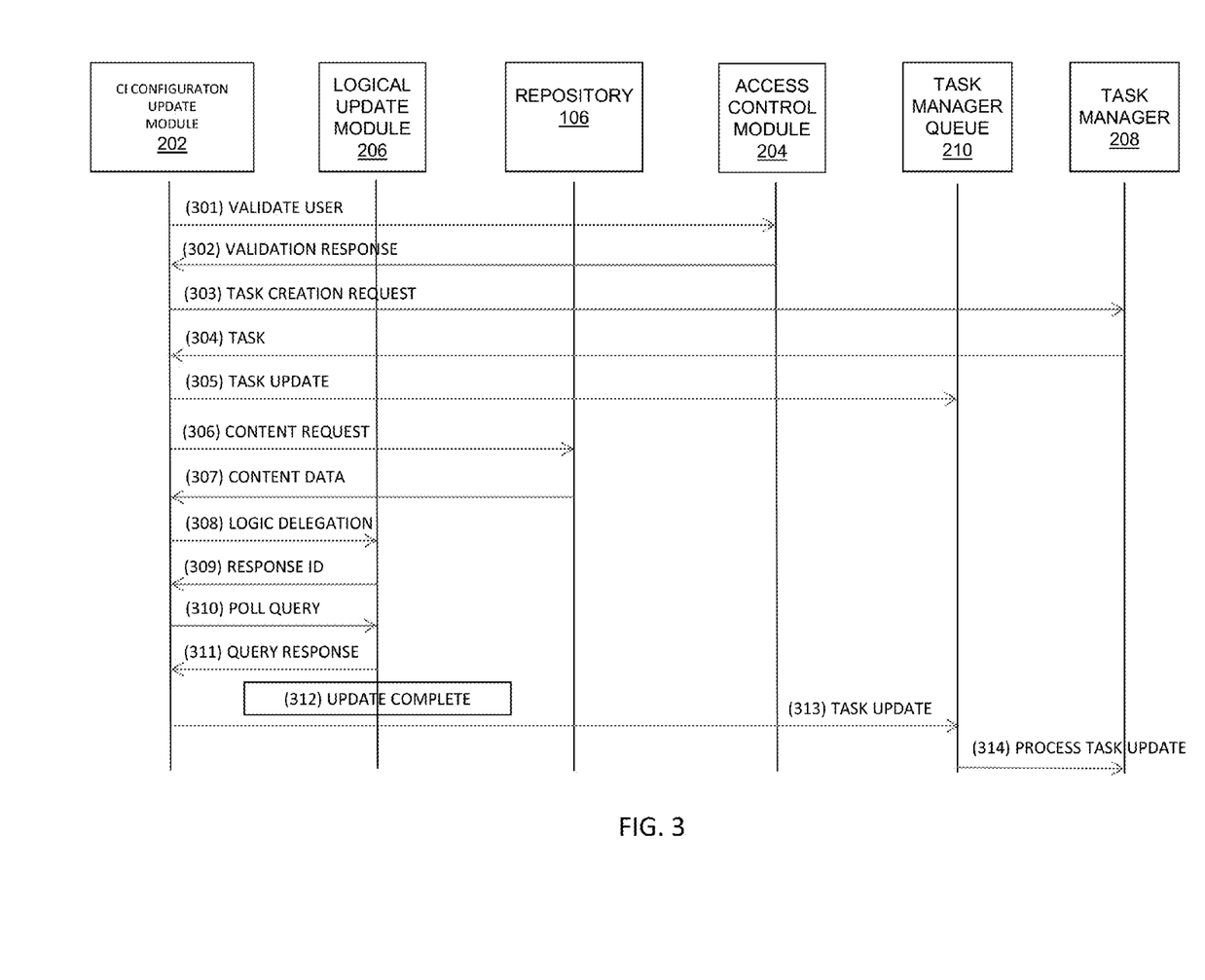
FIG. 3 is a sequence diagram illustrating exemplary messaging associated with implementing a converged infrastructure configuration update according to an embodiment of the subject matter described herein.

FIG. 3 is a sequence diagram illustrating exemplary messaging associated with implementing a CI configuration update according to an embodiment of the subject matter described herein. As previously indicated, the migration of an entire CIS from one CI configuration version to another CI configuration version can prove to be an extremely time consuming process. In some embodiments, each hardware and software component in a CIS needs to be updated in a specified order (as outlined by the CI configuration version) for the migration to complete successfully. Each step of the migration is implemented separately and performed in its own change window (i.e., update time period). Accordingly, CI configuration update module 202 can be configured to update individual components one at a time. In some embodiments, system operators may wish to update components in a slightly different order than the defined standard order. CI configuration update module 202 can support updates occurring in any order. For example, the UI may provide the suggested order from an update guide while still allowing the system operator to select a different order. CI configuration update module 202 may also be configured to update the identified CIS components in a sequential manner, such as a updating the CIS components in a specified order (e.g., a sequential update process). Alternatively, multiple CIS components may be updated by CI configuration module 202 in a contemporaneous manner such that the CIS components are updated in parallel (e.g., a contemporaneous update process). In one example, a single CIS may include a plurality of clusters, each of which comprises different compute servers whose operations do not impact each other. In such a scenario, a parallel CIS update operation may be conducted on a compute server from each cluster simultaneously or contemporaneously.

Specifically, the sequence diagram of FIG. 3 depicts an exemplary flow process conducted in response to a user (e.g., CIS operator) initiating an update a CIS component. Although FIG. 3 illustrates an exemplary embodiment of a CI configuration update procedure performed by a CIS manager that utilizes tasks, it is understood that the aforementioned CI configuration update may be conducted by the CIS manager via one or more alternate methods (e.g., without keeping track of the completion of the tasks or without utilizing tasks at all).

Referring to FIG. 3, CI configuration update module 202 can be configured to perform a number of actions each time a component update procedure is conducted. For example, after receiving a CIS update request from a user (e.g., via a vCenter plugin), CI configuration update module 202 may be configured to send a validation message 301 to access control module 204 in order to authenticate the user and to determine if the user is authorized to conduct the update for a specific CIS component. In one embodiment, a caller thread in CI configuration update module 202 thread utilizes logic to verify that the user has the appropriate rights to invoke the update process. In some embodiments, authentication of a user may require the utilization of a known and/or configured service level account by CI configuration update module 202. Similarly, authorization of a user may be conducted via CI configuration update module 202. For example, CI configuration update module 202 may communicate with access control module 204 to determine the user's permissions.

Upon conducting the requested authentication and authorization checks, access control module 204 can respond to CI configuration update module 202 by sending a validation response message 302, which may include the user's permissions. CI configuration update module 202 may then check the indicated permissions to determine if the user has access to the update the given component.

After receiving response message 302, CI configuration update module 202 may send a task creation request message 303 to task manager 208. Task manager 208 may then be configured to generate a task for the update procedure and respond back to CI configuration update module 202 with a task message 304. Upon receiving message 304, CI configuration update module 202 may send a task update message 305 (e.g., an AMQP message) to task manager queue 210 to indicate that the task is currently being run. In some embodiments, CI configuration update module 202 may subsequently send a content request message 306 to a repository, such as repository 106. The repository, in response to received message 306, may provide the required update content information for the specific CI configuration version (e.g., an RCM version) and component to CI configuration update module 202 via message 307.

In some embodiments, CI configuration update module 202 can be configured to delegate the update logic required to perform the update implementation. For example, CI configuration update module 202 can send a message 308 that contains logic delegation information. Upon receiving message 308, CIS logical update module 206 sends a response message 309 comprising a polling identifier to CI configuration update module 202. For example, a caller thread in CI configuration update module 202 receives an identifier that the caller thread can use to poll for the status of the update.

In some embodiments, CI configuration update module 202 may be configured to query for update status information and results from CIS logical update module 206. For example, CI configuration update module 202 can send a polling query message 310 containing a polling identifier to logical update module 206. In addition, CI configuration update module 202 can also be configured to send progress messages (e.g., AMQP progress messages) to task manager queue 210 containing data obtained from status polling. CI configuration update module 202 may also store the results from the update procedure including all input and output data associated with the update procedure.

After CIS logical update module 206 completes the update procedure (see block 312), CI configuration update module 202 can send a task update message (e.g., an AMQP message) indicating the completed task to task manager queue 210. Task manager queue 210 in turn generates and sends a message 314 instructing task manager 208 to process the task update.

Figure 4:
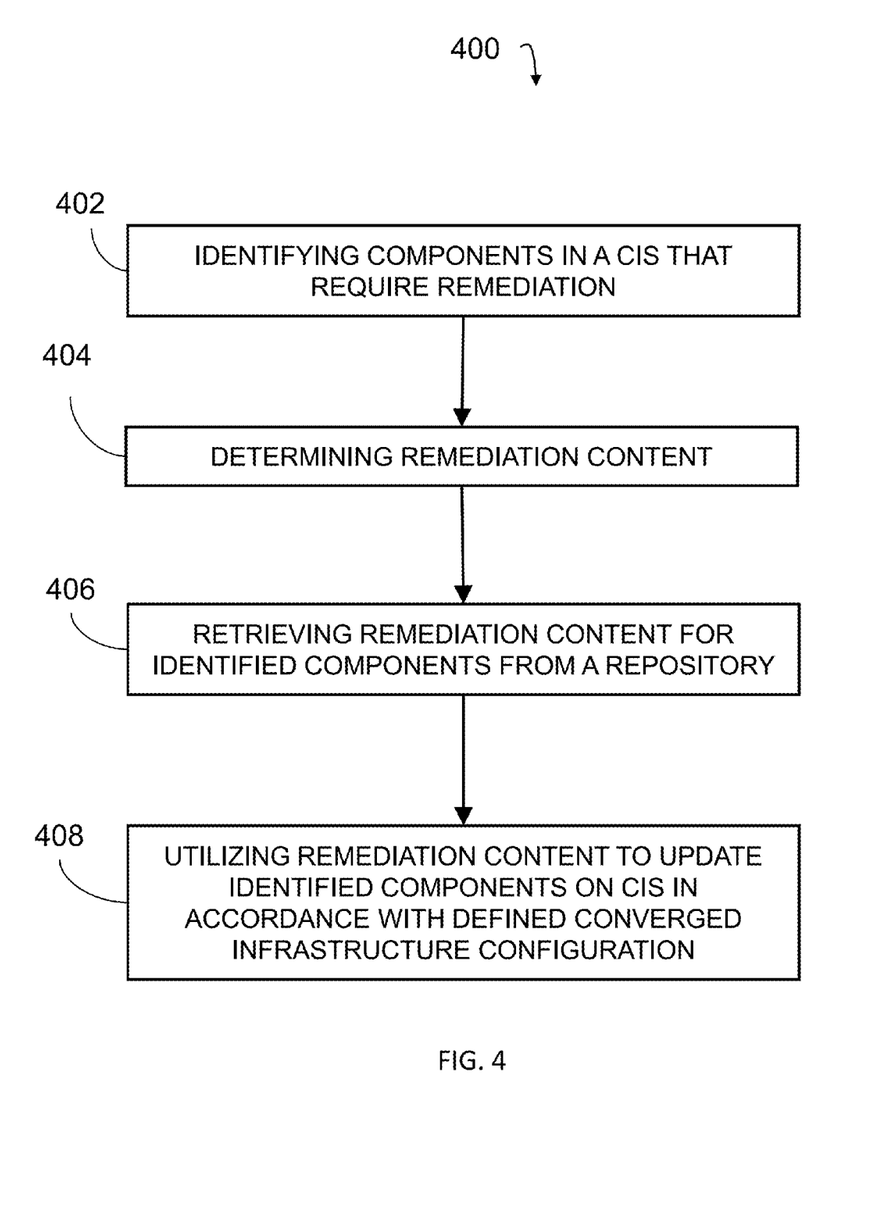
FIG. 4 is a diagram illustrating an exemplary method for updating components in a converged infrastructure system according to an embodiment of the subject matter described herein.

FIG. 4 is a diagram illustrating an exemplary method 400 for updating components in a converged infrastructure system according to an embodiment of the subject matter described herein. In step 402, components in a CIS are identified. In some embodiments, a CIS manager identifies components of a CIS unit that require remediation in order to comply with a defined CI configuration. For example, a CIS manager may utilize a compliance check module to compare the revision numbers of CIS components associated with the defined CI configuration to the revision numbers of the CIS components in the CIS to be updated.

In step 404, remediation content, such as remediation software content, is determined. In some embodiments, the remediation content that enables each of the identified CIS components to be compliant with the defined CI configuration is determined by the CIS manager.

In step 406, remediation content is retrieved. In some embodiments, the CIS manager retrieves the remediation content for the identified components from a repository.

In step 408, the remediation content is utilized. In some embodiments, the remediation content is used to update the identified components on the CIS unit in accordance with the defined CI configuration (e.g., an RCM).

To help resolve the CI configuration update problem for customers, the CIS manager may be configured to enable system operators to view a UI displaying the CIS components that need to be updated in order to migrate to a particular CI configuration update, such as an RCM update. In addition, the CIS manager may also be configured to guide the system operator through the update process and ensure that the components are updated in the correct order. The system operator may be required to plan out a set of maintenance windows associated with the RCM update.

Figure 5:
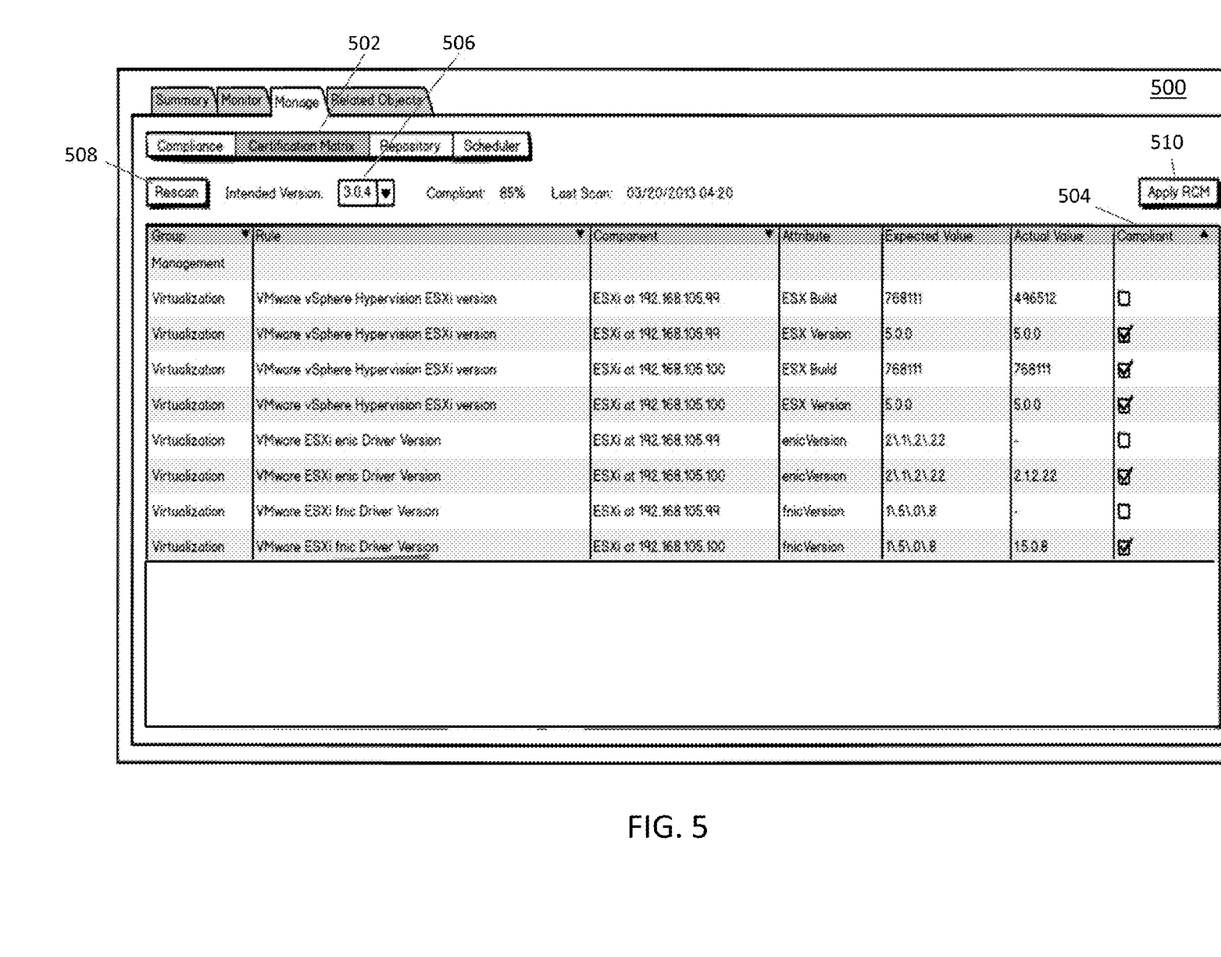
FIG. 5 is an exemplary screen display of a user interface used for managing a converged infrastructure configuration update according to an embodiment of the subject matter described herein.

For example, FIG. 5 depicts an exemplary UI display 500 that presents compliance RCM result information (i.e., data indicating how close a current CIS version is to a particular RCM) to a user. UI display 500 comprises a certification matrix tab 502 that visually presents compliance RCM information (e.g., UI column 504) indicating the CIS components that require updating to a user. Similarly, UI element 506 (e.g., a dropdown menu) provides a user the ability to select one of a plurality of RCM versions that may be used to update the CIS unit. UI display 500 also affords a user the ability to execute a new compliance RCM scan (e.g., UI element 508). In such a scenario, UI display 500 will update when the new results are available. UI element 510 (e.g., UI button) on UI display 500 allows a user to initiate the RCM update process. Although UI display 500 presents an exemplary interface compatible with an RCM, it is understood that there are other exemplary embodiments in which UI display 500 may be compatible with other CI configurations without departing from the scope of the disclosed subject matter.

Figure 6:
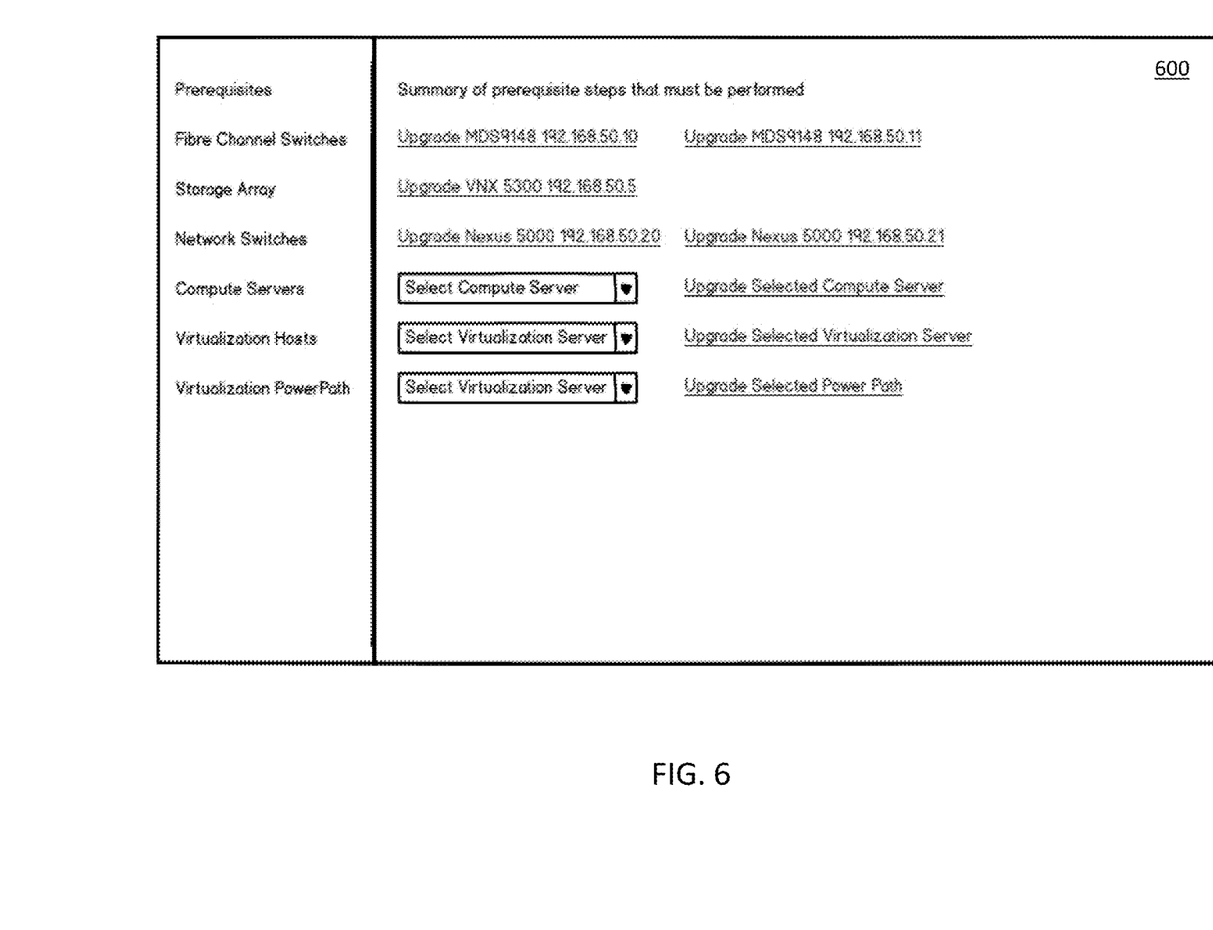
FIG. 6 is an exemplary screen display of a user interface utilized for conducting a release certification matrix update according to an embodiment of the subject matter described herein.

In the event a user selects UI element 510 to perform the RCM update, an exemplary UI display 600 shown in FIG. 6 may be displayed as an overlay window. Notably, each CIS component that requires an update will be listed and enabled. Likewise, components that have been previously updated to the correct version for the CI configuration may be listed, but not enabled. In some embodiments, the user may be presented with an option via UI display 600 to perform the update in any desired order. In alternate embodiments, the listed order of components may be the same as a defined order presented in an update guide (i.e., the suggested order). Although UI display 600 depicts an exemplary implementation in which a number of separate individual components (e.g., an individual compute server, an individual virtualization host, etc.) are selected for updating, it is understood that UI display 600 may be configured to select a plurality of similar components (e.g., a plurality of compute servers, a plurality of virtualization hosts, etc.) or a plurality of different updates in other embodiments without departing from the scope of the disclosed subject matter. Furthermore, although UI display 600 presents an exemplary interface compatible with an RCM, it is understood that there are other exemplary embodiments in which UI display 600 may be compatible with other CI configurations without departing from the scope of the disclosed subject matter.

Figure 7:
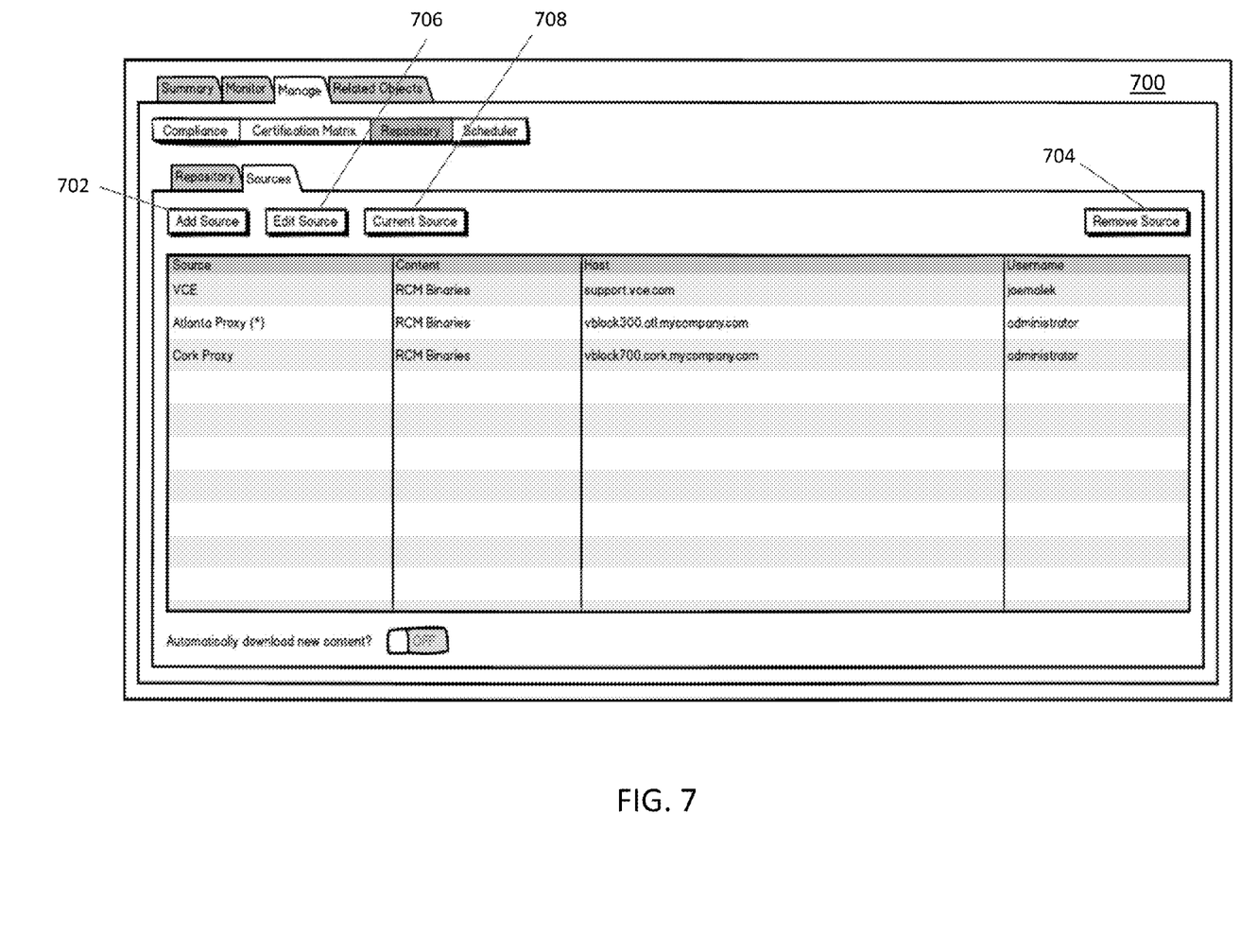
FIG. 7 is an exemplary screen display of a user interface utilized for managing a plurality of repository sources according to an embodiment of the subject matter described herein.

FIG. 7 illustrates an exemplary UI display 700 of a repository interface. Although UI display 700 presents an exemplary interface compatible with an RCM, it is understood that there are other exemplary embodiments in which UI display 700 may be compatible with other CI configurations without departing from the scope of the disclosed subject matter. In some embodiments, UI display 700 may be utilized to administer repository sources and to manage repository content. For example, a user can add (e.g., via UI element 702), remove (e.g., via UI element 704), and edit (e.g., via UI element 706) repository sources. In some embodiments, a repository source can include a public distributed content site, a local proxy server in a customer's environment, a repository on a local CIS unit, or another repository on a different CIS unit. The ability to set the current source (e.g., via UI element 708) is also provided. Utilizing UI element 708 to set the current source will set an indicator in the source column. In some embodiments, updates can be pulled from the specified current source either on demand or automatically through a schedule.

Figure 8:
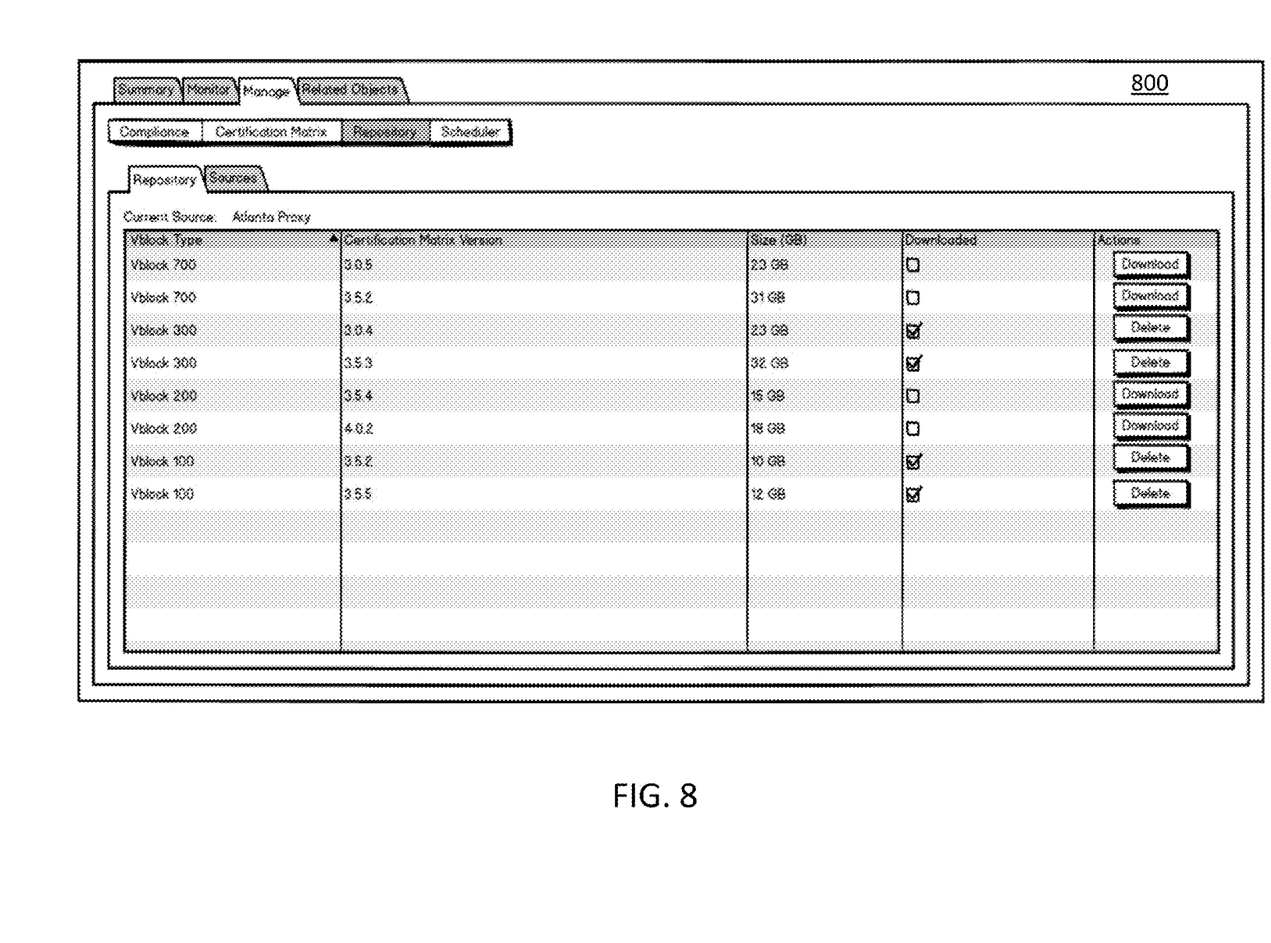
FIG. 8 is an exemplary screen display of a user interface utilized for managing updates for a plurality of converged infrastructure system units associated with a repository source according to an embodiment of the subject matter described herein.

In some embodiments, a user has the ability to select the update content to be downloaded to a local CIS repository. For example, FIG. 8 illustrates an exemplary UI display 800 that presents the various CIS units at a particular source (i.e., source location). Notably, UI display 800 can be useful for users that operate a series of CIS models in a datacenter but wish to download update content to a single location prior to distribution throughout the datacenter. The user can also utilize UI display 800 to delete update content that is no longer needed. Although UI display 800 presents an exemplary interface compatible with an RCM, it is understood that there are other exemplary embodiments in which UI display 800 may be compatible with other CI configurations without departing from the scope of the disclosed subject matter.

Figure 9:
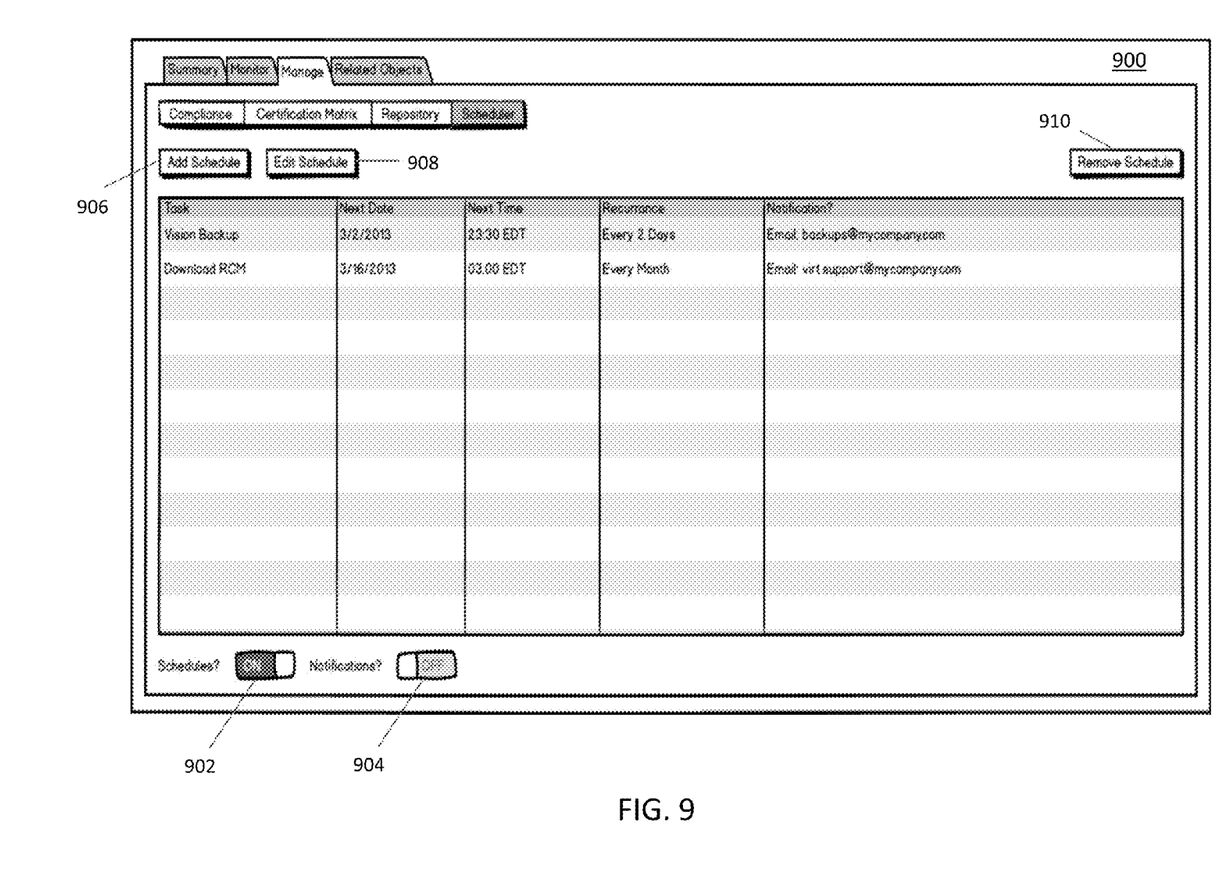
FIG. 9 is an exemplary screen display of a user interface utilized for managing various update schedules according to an embodiment of the subject matter described herein.

FIG. 9 illustrates an exemplary UI display 900 of a scheduler interface. In some embodiments, UI display 900 allows the user to manage various schedules within CIS manager 102 (as shown in FIG. 1). For example, UI display 900 provides a user with the ability to automatically download new RCM binaries for a particular schedule. The schedules can be quickly enabled/disabled on a global level (e.g., using UI element 902). There is also the ability to enable/disable notifications for each schedule on a global level (e.g., using UI element 904). In some embodiments, selecting the Add Schedule or Edit Schedule buttons (e.g., UI elements 906 and 908) will launch a scheduling wizard configured to allow the addition or modification of a schedule. UI display 900 may also include a UI element 910 that may be used to remove schedules. Although UI display 900 presents an exemplary interface compatible with an RCM, it is understood that there are other exemplary embodiments in which UI display 900 may be compatible with other CI configurations without departing from the scope of the disclosed subject matter.

Figure 10:
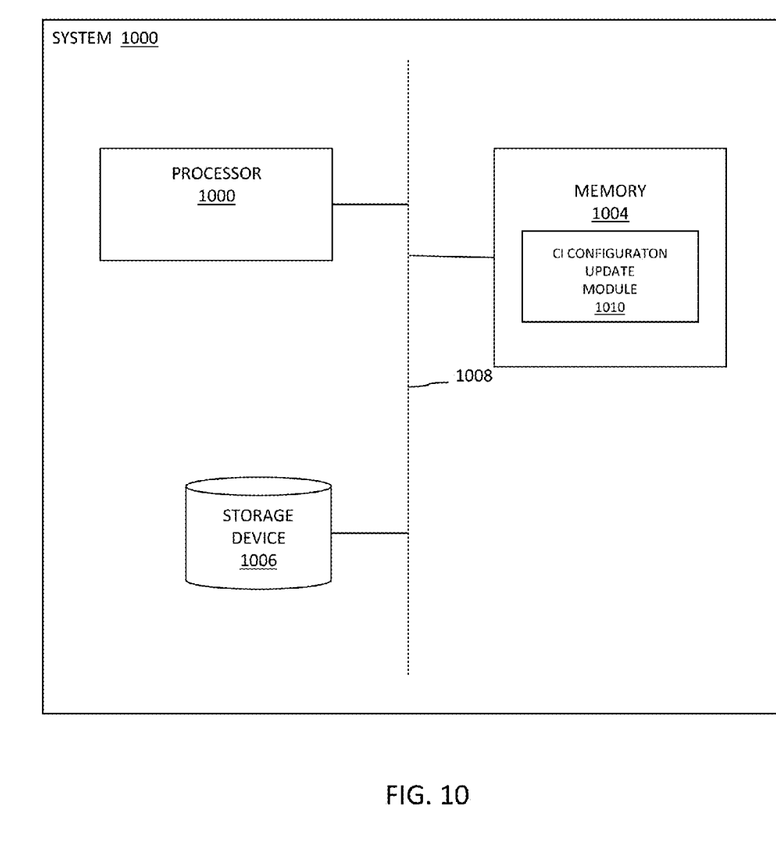
FIG. 10 is a high level block diagram of an exemplary general purpose computer system suitable for use in performing the functions described herein.

FIG. 10 depicts a high level block diagram of a general purpose computer system suitable for use in performing the functions described herein. As depicted in FIG. 10, system 1000 includes a processor 1002, a memory 1004, and a storage device 1006 communicatively connected via a system bus 1008. In some embodiments, processor 1002 can include a microprocessor, central processing unit (CPU), or any other like hardware based processing unit. In some embodiments, a CI update module 1010 can be stored in memory 1004, which can include random access memory (RAM), read only memory (ROM), optical read/write memory, cache memory, magnetic read/write memory, flash memory, or any other non-transitory computer readable medium. In some embodiments, processor 1002 and memory 1004 can be used to execute and manage the operation of CI update module 1010. In some embodiments, storage device 1006 can include any storage medium or storage unit that is configured to store data accessible by processor 1002 via system bus 1008. Exemplary storage devices can include one or more local databases hosted by system 1000.

As indicated above, the subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. As used in the present disclosure, the terms "function" or "module" refer to hardware, firmware, or software in combination with hardware and/or firmware for implementing features described herein.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for updating components in a converged infrastructure system, the method comprising:
    identifying components in a converged infrastructure system that require remediation in order to comply with a defined converged infrastructure configuration by comparing software revision identifiers associated with the defined converged infrastructure configuration to software revision identifiers associated with the components in the converged infrastructure system;
    determining remediation content to enable each of the identified components to be compliant with the defined converged infrastructure configuration;
    retrieving the remediation content for the identified components from a repository; and utilizing the remediation content to update the identified components in the converged infrastructure system in accordance with the defined converged infrastructure configuration, wherein the identified components are updated with the remediation content in an order specified by the defined converged infrastructure configuration, and wherein the identified components are updated in a manner that includes a process selected from a group consisting of a sequential update process and a contemporaneous update process.

2. The method of claim 1 wherein the remediation content comprises a package selected from a group consisting of a firmware package, a BIOS package, and a software package.

3. The method of claim 1 wherein the remediation content comprises binary software content.

4. The method of claim 1 comprising determining a schedule for remediating the identified components in the converged infrastructure system and wherein the identified components are updated in accordance with the schedule.

5. The method of claim 1 wherein the repository is provisioned with remediation content that is sourced from a second repository.

6. A converged infrastructure system, the system comprising:
   an update module stored in a memory configured to:
      identify components in a converged infrastructure system that require remediation in order to comply with a defined converged infrastructure configuration by comparing software revision identifiers associated with the defined converged infrastructure configuration to software revision identifiers associated with the components in the converged infrastructure system,
      determine remediation content to enable each of the identified components to be compliant with the defined converged infrastructure configuration,
      retrieve the remediation content for the identified components, and
      utilize the remediation content to update the identified components in the converged infrastructure system in accordance with the defined converged infrastructure configuration, wherein the identified components are updated with the remediation content in an order specified by the defined converged infrastructure configuration, and wherein the identified components are updated in a manner that includes a process selected from a group consisting of a sequential update process and a contemporaneous update process; and
   a repository configured to store the remediation content for the identified components.

7. The system of claim 6 wherein the remediation content comprises a package selected from a group consisting of a firmware package, a BIOS package, and a software package.

8. The system of claim 6 wherein the remediation content comprises binary software content.

9. The system of claim 6 wherein the update module is further configured to determine a schedule for remediating the identified components in the converged infrastructure system and wherein the identified components are updated in accordance with the schedule.

10. The system of claim 6 wherein the repository is provisioned with remediation content that is sourced from a second repository on a second converged infrastructure system or from an online location.

11. A non-transitory computer readable medium having stored thereon executable instructions that when executed by the processor of a computer control the computer to perform steps comprising:
   identifying components in a converged infrastructure system that require remediation in order to comply with a defined converged infrastructure configuration by comparing software revision identifiers associated with the defined converged infrastructure configuration to software revision identifiers associated with the components in the converged infrastructure system;
   determining remediation content to enable each of the identified components to be compliant with the defined converged infrastructure configuration;
   retrieving the remediation content for the identified components from a repository; and
   utilizing the remediation content to update the identified components in the converged infrastructure system in accordance with the defined converged infrastructure configuration, wherein the identified components are updated with the remediation content in an order specified by the defined converged infrastructure configuration, and wherein the identified components are updated in a manner that includes a process selected from a group consisting of a sequential update process and a contemporaneous update process.

12. The non-transitory computer readable medium of claim 11 the remediation content comprises a package selected from a group consisting of a firmware package, a BIOS package, and a software package.

13. The non-transitory computer readable medium of claim 11 comprising determining a schedule for remediating the identified components in the converged infrastructure system and wherein the identified components are updated in accordance with the schedule.

14. The non-transitory computer readable medium of claim 11 wherein the repository is provisioned with remediation content that is sourced from a second repository.

* * * * *